(12) United States Patent
Chan

(10) Patent No.: US 10,008,752 B1
(45) Date of Patent: Jun. 26, 2018

(54) SAFETY FEATURE FOR ENERGY STORAGE DEVICE

(71) Applicant: ANHUI XINEN TECHNOLOGY CO., LTD., Anqing Anhui (CN)

(72) Inventor: John R. Chan, Fremont, CA (US)

(73) Assignee: ANHUI XINEN TECHNOLOGY CO., LTD., Anqing Anhui (CN)

( * ) Notice: Subject to any disclaimer, the term of this patent is extended or adjusted under 35 U.S.C. 154(b) by 0 days. days.

(21) Appl. No.: 15/592,127

(22) Filed: May 10, 2017

Related U.S. Application Data

(60) Provisional application No. 62/438,981, filed on Dec. 23, 2016.

(51) Int. Cl.
| | |
|---|---|
| *H01M 10/6556* | (2014.01) |
| *H01M 2/34* | (2006.01) |
| *H01M 10/625* | (2014.01) |
| *H01M 10/48* | (2006.01) |
| *H01M 10/613* | (2014.01) |

(52) U.S. Cl.
CPC ....... *H01M 10/6556* (2015.04); *H01M 2/347* (2013.01); *H01M 10/48* (2013.01); *H01M 10/613* (2015.04); *H01M 10/625* (2015.04); *H01M 2200/00* (2013.01); *H01M 2220/20* (2013.01)

(58) Field of Classification Search
None
See application file for complete search history.

(56) References Cited

U.S. PATENT DOCUMENTS

| | | |
|---|---|---|
| 4,245,010 A | 1/1981 | Golz |
| 4,328,297 A | 5/1982 | Bilhorn |
| 5,004,129 A | 4/1991 | Loch et al. |
| 8,309,240 B1 | 11/2012 | Li et al. |
| 9,620,830 B2 | 4/2017 | Chan et al. |
| 2004/0012159 A1 | 1/2004 | Senda et al. |

(Continued)

FOREIGN PATENT DOCUMENTS

| | | |
|---|---|---|
| CN | 101882688 A | 11/2010 |
| DE | 102011017375 A1 | 1/2012 |

(Continued)

OTHER PUBLICATIONS

International Search Report and Written Opinion dated Oct. 23, 2015, for International Application No. PCT/US2015/041364 (10 pages).

(Continued)

*Primary Examiner* — Sarah A. Slifka
(74) *Attorney, Agent, or Firm* — Perkins Coie LLP

(57) ABSTRACT

Disclosed is a technique for detecting a hazardous condition by a conductive layer in an energy storage device. An energy storage device assembly includes a conductive layer configured to cause a change in an electrical parameter in the event of a hazardous condition. A melting point of the conductive layer is lower than a boiling point of a liquid coolant. An electrical sensor is electrically connected to the conductive layer and configured to detect a change in the electrical parameter in the conductive layer. Upon detecting a change in the electrical parameter associated with a hazardous condition, an energy management system suspends operation of the energy storage device.

21 Claims, 9 Drawing Sheets

(56) References Cited

U.S. PATENT DOCUMENTS

| | | |
|---|---|---|
| 2008/0003491 A1 | 1/2008 | Yahnker et al. |
| 2008/0182158 A1 | 7/2008 | Houchin-Miller et al. |
| 2008/0220316 A1 | 9/2008 | Berkowitz et al. |
| 2009/0220850 A1 | 9/2009 | Bitsche et al. |
| 2010/0047673 A1 | 2/2010 | Hirakawa et al. |
| 2010/0116570 A1 | 5/2010 | Sugawara et al. |
| 2010/0134940 A1 | 6/2010 | Nguyen et al. |
| 2010/0136391 A1 | 6/2010 | Prilutsky et al. |
| 2010/0183920 A1 | 7/2010 | Brecht William B et al. |
| 2010/0270976 A1 | 10/2010 | Tamura et al. |
| 2010/0273034 A1 | 10/2010 | Hermann et al. |
| 2010/0285346 A1 | 11/2010 | Graban et al. |
| 2011/0097617 A1 | 4/2011 | Gu et al. |
| 2011/0195284 A1 | 8/2011 | Yasui et al. |
| 2012/0133521 A1 | 5/2012 | Rothkopf et al. |
| 2012/0231317 A1 | 9/2012 | Shimizu et al. |
| 2013/0183566 A1 | 7/2013 | Wayne et al. |
| 2014/0002269 A1 | 1/2014 | Zhou |
| 2015/0132628 A1* | 5/2015 | Bradwell ............... H01M 2/18 429/103 |
| 2015/0338470 A1* | 11/2015 | Zumstein ............ H01M 10/486 324/426 |
| 2016/0172727 A1 | 6/2016 | Chan et al. |

FOREIGN PATENT DOCUMENTS

| | | |
|---|---|---|
| FR | 2977378 A1 | 1/2013 |
| JP | 2005534143 A | 11/2005 |
| JP | 2010277948 A | 12/2010 |
| WO | 03103083 A2 | 12/2003 |
| WO | WO03103083 A2 | 12/2003 |
| WO | 2013018331 A1 | 2/2013 |
| WO | 2013131588 A2 | 9/2013 |

OTHER PUBLICATIONS

Non-Final Office Action dated Dec. 24, 2015 of U.S. Appl. No. 14/795,411 by Chan, J.R., et al., filed Jul. 9, 2015.

Non-Final Office Action dated Jul. 1, 2016 of U.S. Appl. No. 14/795,411 by Chan, J.R., et al., filed Jul. 9, 2015.

Notice of Allowance dated Dec. 5, 2016 of U.S. Appl. No. 14/795,411 by Chan, J.R., et al., filed Jul. 9, 2015.

Supplementary Search Report Dated Jun. 30, 2017 of European Patent Application No. 15870501.2 (8 pages).

International Search Report and Written Opinion dated Apr. 14, 2017 for related PCT Application No. PCT/US2017/016713 (11 pages).

U.S. Appl. No. 15/421,794 of Chan, J.R. filed Feb. 1, 2017.

First Office Action with Search Report dated Feb. 24, 2018 for Chinese Patent Application No. 201580061640.6 filed Aug. 14, 2017.

International Search Report and Written Opinion dated Apr. 9, 2018 for related PCT Patent Application No. PCTUS2017/032740.

* cited by examiner

SAFETY FEATURE FOR ENERGY STORAGE DEVICE

This application claims the benefit of U.S. Provisional Patent Application No. 62/438,981, titled "Triple Function Sensing—as a Temperature Limiter, Water Presence Detector and an Impact Sensor in Electrical Vehicle Safety Feature" and filed on Dec. 23, 2016, which is incorporated by reference herein in its entirety.

TECHNICAL FIELD

At least one embodiment of the technique introduced herein relates to an energy storage device, and more particularly, to an energy storage device assembly having a conductive layer configured to cause a change in an electrical parameter in the event of a hazardous condition.

BACKGROUND

Failure of an energy storage device, such as a rechargeable battery or battery cell, can result from, for example, stress events. Stress events can include, for example, charging at a sub-freezing temperature, vibrations, or a collision. Energy storage device failures can result in, for example, a mild short or thermal runaway. A mild short can cause elevated self-discharge where heat buildup is minimal because power discharge is low. However, if enough metallic particles converge in one spot, a sizable current can begin to flow between electrodes of a cell, and the spot can heat up and weaken. Thermal runway can result in a battery cell temperature quickly reaching 500° C. (932° F.), at which point the cell can catch fire or explode. Thermal runaway is also known as "venting with flame" and "rapid disassembly" by some industry professionals.

Battery cells in a battery module, such as may be used in an electric vehicle, are typically in close proximity to one another. An explosion of one cell in a battery module can propagate to other cells in the battery module, causing the other cells to become thermally unstable or explode. An explosion can propagate to multiple cells or an entire battery pack in a chain reaction, resulting in catastrophic damage to the battery module and anything within proximity of the battery module.

Additionally, accidental collision is possible even in the most conservative and advanced electric vehicles, putting the electric vehicles and occupants at risk from fire or explosion of an energy storage device due to a collision. The energy density of battery cells is expected to double every few years, with 10 times current energy density being developed in university laboratories. The higher the energy density of an energy storage device is, the more critical safety features become for both vehicle safety and longevity of energy storage devices.

DETAILED DESCRIPTION

Figure 1:
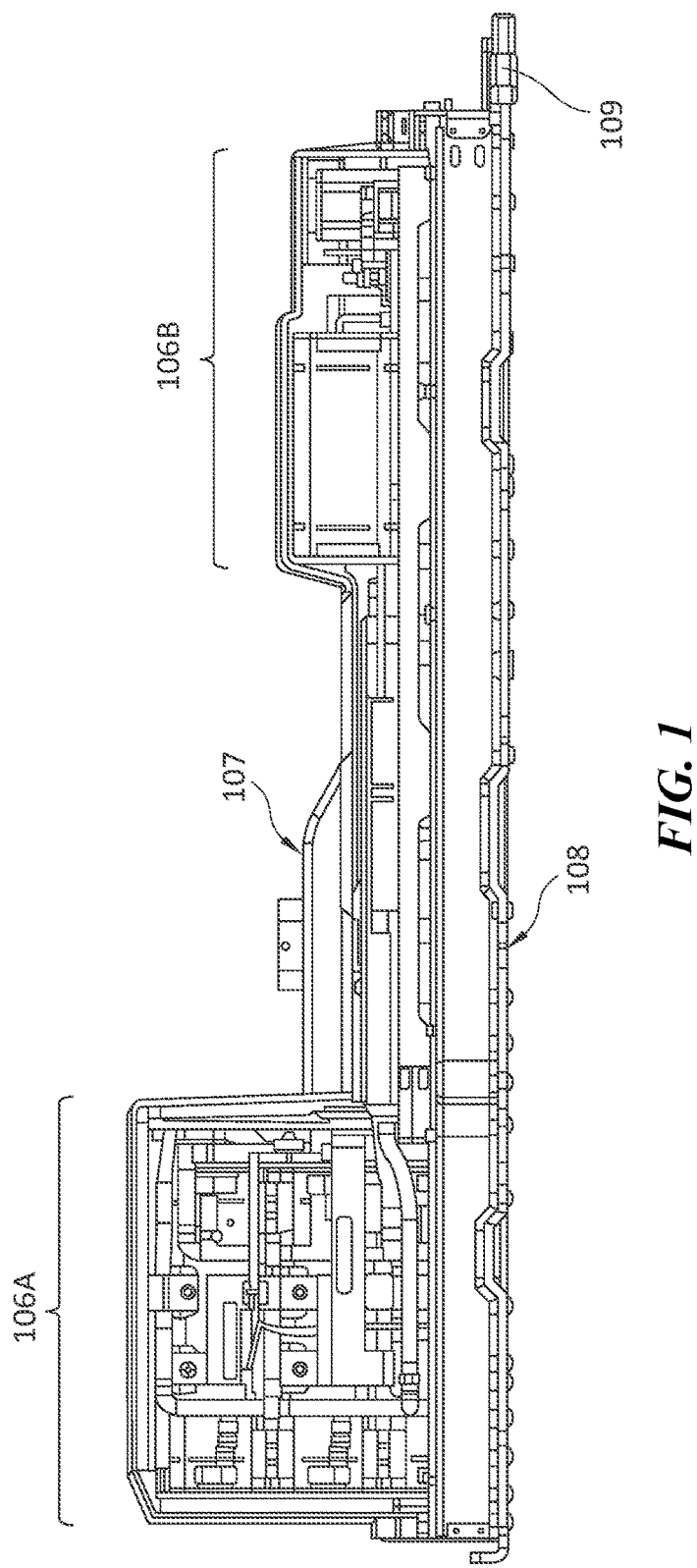
FIG. 1 illustrates an energy storage device in a cross-sectional view, exposing internal components of the energy storage device.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments described are not necessarily mutually exclusive.

Safety of passengers in an electric vehicle can be compromised by a hazardous condition of the electrical vehicle. A hazardous condition includes high temperature or presence of fire, stress events like a collision, or presence of water. Continued operation of an energy storage device having a high voltage supply can exacerbate a hazardous condition. Introduced here is an energy storage device that has one or more conductive layers to detect a single hazardous condition or multiple hazardous conditions (e.g., high temperature or presence of fire, stress events like a collision, and presence of water). Upon detecting a hazardous condition, an energy management system can suspend operation of the energy storage device. The energy management system can be referred to as a "battery management system" or "BMS."

The energy storage device can include a plurality of rechargeable cells (e.g., electrochemical cells) enclosed by a top cover, bottom cover, and sidewalls. A coolant delivery system distributes a liquid coolant to any of the plurality of cells within the enclosure. A conductive layer can be made to extend along the enclosure and to carry a current, where a melting point of the conductive layer is lower than a boiling point of the liquid coolant.

An electrical sensor (e.g., a current and/or voltage sensor) can be electrically connected to the conductive layer and configured to detect a change in an electrical parameter in the conductive layer. The electrical parameter can include, for example, current, voltage, or a combination thereof.

A hazardous condition (e.g., thermal runaway, stress event, moisture etc.) causes a change in an electrical parameter in the conductive layer. Since the conductive layer has a melting point lower than the boiling point of the liquid coolant, thermal runaway in the energy storage device can cause a change in an electrical parameter in the conductive layer (e.g., by melting the conductive layer and creating an open circuit) before the liquid coolant evaporates and outgases. Outgassing of the liquid coolant can result in coolant loss which can contribute to thermal runaway and/or an explosion. Upon detecting a change in an electrical parameter in the conductive layer (e.g., detecting no current due to an open circuit), operation of the energy storage device is suspended. Suspending operation of the energy storage device can prevent outgasing of the liquid coolant, thermal runaway, and/or an explosion.

A stress event (e.g., a collision) sufficient to fracture the enclosure can fracture the conductive layer extending along the enclosure. Fracturing the conductive layer can cause a change in an electrical parameter in the conductive layer (e.g., by creating an open circuit). Upon detecting a change in an electrical parameter in the conductive layer (e.g., detecting no current due to an open circuit), operation of the energy storage device is suspended. Suspending operation can prevent continued use of a structurally compromised energy storage device.

Moisture in contact with the conductive layer can create a short circuit by providing another path for current to flow. Upon detecting a change in an electrical parameter (e.g., current and/or voltage) in the conductive layer (e.g., detecting a decrease in current due to the short circuit), operation of the energy storage device is suspended. Suspending operation can prevent continued use of a compromised energy storage device.

FIG. 1 shows a cross-sectional view of an energy storage device, exposing internal components of the energy storage device. The energy storage device include an enclosure having a top cover 107, bottom cover 108, and one or more side walls. The energy storage device can include, for example, a battery pack having a plurality of battery cells, a fuel cell pack having a plurality of fuel cells, or a combination thereof. The energy storage device can be configured for use in a vehicle (e.g., an automobile, unmanned vehicle, etc.). The energy storage device can include one or more bumpers (e.g., bumper 108) positioned in any direction including, for example, a front, rear, or side of the energy storage device.

Figure 2:
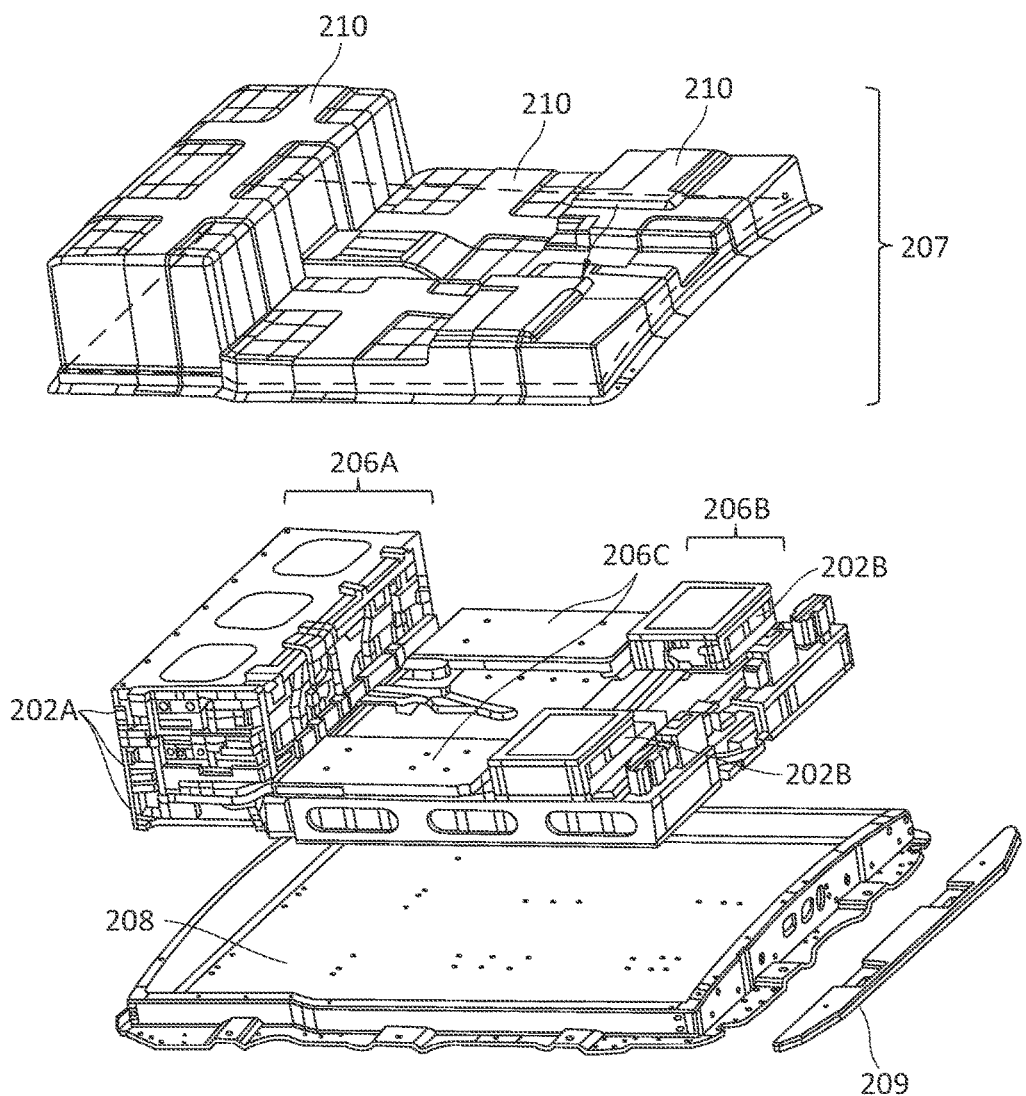
FIG. 2 illustrates the energy storage device in an exploded view.

FIG. 2 shows an exploded view of the energy storage device. The energy storage device can be enclosed by a cover 207 (e.g., the upper cover 107) and a liner 208 (e.g., bottom cover 108). The cover 207 can enclose a top portion and one or more side portions of the energy storage device. The enclosure (e.g., cover 207 and liner 208) contains and protects cell cases 206A, 206B, and 206C. Cell cases hold groups of cells (e.g., cell groups 202A and 202B). The liner 208 can enclose a bottom portion of the energy storage device. The energy storage device can be used in an electric vehicle. The liner 208 can serve as a shield in the undercarriage of the electric vehicle.

The disclosed technique includes terminating a direct current voltage supply of the energy storage device or portion thereof (e.g., a particular cell) in response to the energy storage device or portion thereof (1) reaching a predetermined temperature, (2) explosion of one or more cells or components, (3) a collision, (4) moisture in the enclosure, or (5) any combination thereof.

A conductive layer 210 can be used for detection of hazardous conditions (e.g., high temperature, explosion, collision, and/or moisture). The conductive layer 210 can be a low temperature alloy. The conductive layer 210 can be composed of bismuth, lead, tin, cadmium, indium, thallium, mercury, gallium, one or more alkali metals, aluminum, germanium, silicon, antimony, silver, gold, platinum, palladium, indium, iron, manganese, or any combination thereof. For example, the conductive layer 210 can include approximately 40-60% bismuth by weight, approximately 20-30% lead by weight, and approximately 20-30% tin by weight. In another example, the conductive layer 210 can include approximately 40-50% bismuth by weight, approximately 20-25% lead by weight, approximately 20-25% tin by weight, and approximately 1-10% trace elements by weight (e.g., any combination of indium, cadmium, thallium, gallium, or antimony). In an example, the conductive layer 210 can include approximately 40% bismuth by weight, approximately 15% lead by weight, and approximately 45% tin by weight. In an example, the conductive layer 210 can include approximately 35-45% bismuth by weight, approximately 35-45% lead by weight, approximately 5-15% tin by weight, and approximately 5-10% cadmium by weight. In an example, the conductive layer 210 can include approximately 40%-60% indium by weight and approximately 40%-60% tin by weight. In an example, the conductive layer 210 can include approximately 40%-60% lead by weight and approximately 40%-60% bismuth by weight.

The alloy may be a eutectic system such that a lattice structure transforms into a liquid mixture at once or may be a non-eutectic system. The conductive layer 210 including approximately 50% bismuth, approximately 25% lead, and approximately 25% tin can have melting point of between approximately 93 degrees C. and 99 degrees C. Many liquid coolants used in electric vehicles have a boiling point around 110 degrees C. The conductive layer 210 can include other alloy combinations capable achieving a melting temperature below a boiling temperature of a liquid coolant.

Many lithium ion battery cells begin to outgas at above 110 degrees C., if venting holes are available, leading to explosion at above 130 degrees C. By including the conductive layer having a melting temperature below the boiling temperature of a liquid coolant, the high temperature condition can be detected before the liquid coolant boils. Once detected, an energy management system can suspend operation of the energy storage device, preventing outgasing and explosion.

An alloy ingot can be extruded into a wire or strip to form the conductive layer 210. The conductive layer 210 can extend along an edge of the enclosure (e.g., cover 207 and liner 208). The conductive layer 210 can form a loop and be connected to a current detector. The current detector can include, for example, a hall effect integrated circuit, a transformer, a resistor, an interferometer, a rogowski coil, or any combination thereof. The current detector can be part of an energy management system that controls and monitors the energy storage device. Upon detecting a change in an electrical parameter (e.g., current and/or voltage) associated with a hazardous condition, the energy management system can terminate operation of the energy storage device.

If the energy storage device is exposed to a temperature exceeding a threshold (e.g., around 95 degree C. depending on composition), the conductive layer 210 melts and the energy management system detects an open circuit in the loop. Upon detecting an open circuit, the energy management system terminates the vehicle electronics from the energy storage device. The energy storage device may provide high voltage direct current power that may cause harm to the passengers and/or the vehicle if operation continues while exposed to the temperature exceeding the threshold. By terminating operation of the energy storage device, a hazardous event (e.g., fire or explosion) may be avoided.

If the energy storage device receives an impact (e.g., during a collision) sufficient to crack open the enclosure (e.g., either of the cover 207 or the liner 208), conductive layer 210 fractures, creating an open circuit. The created open circuit causes a change in an electrical parameter (e.g., a change from some current to no current) detectable by the current detector. Data indicative of current detected by the current detector is streamed to the energy management system. If the energy management system identifies a change in an electrical parameter (e.g., current and/or voltage) associated with a hazardous condition, the energy management system terminates the power source.

If water gets into the energy storage device leaks and comes into contact with the conductive layer 210, a short circuit is created. The electrical sensor detects the short circuit. The energy management system terminates the energy storage system. Terminating the energy storage system may protect the vehicle and occupants of the vehicle from the high voltage source of the energy storage device.

Thus, the conductive layer 210 can serve as a temperature limiter, collision sensor, water leakage sensor, or any combination thereof. Upon detecting a change in an electrical parameter (e.g., current and/or voltage) associated with a high temperature, collision, or water leakage, the energy storage device is terminated. Terminating the energy storage device upon detection of a hazardous condition may protect a vehicle and the vehicles occupants from a high voltage power source.

Figure 4:
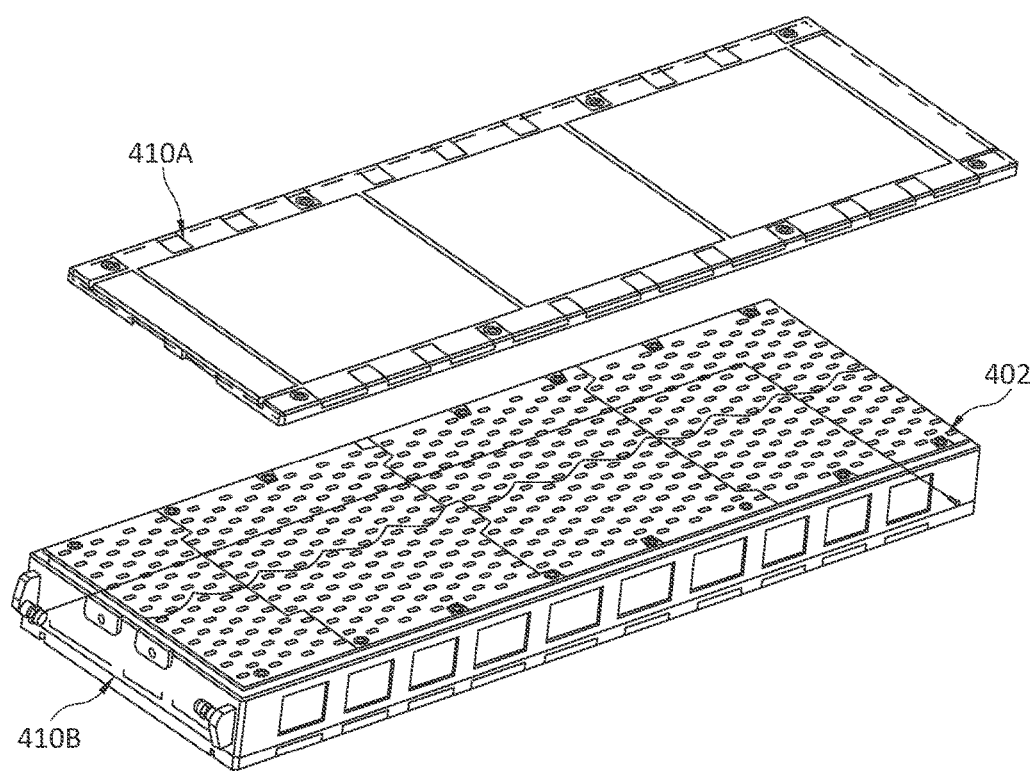
FIG. 4 illustrates an exploded isotropic view of a case for a group of cells.
Figure 5:
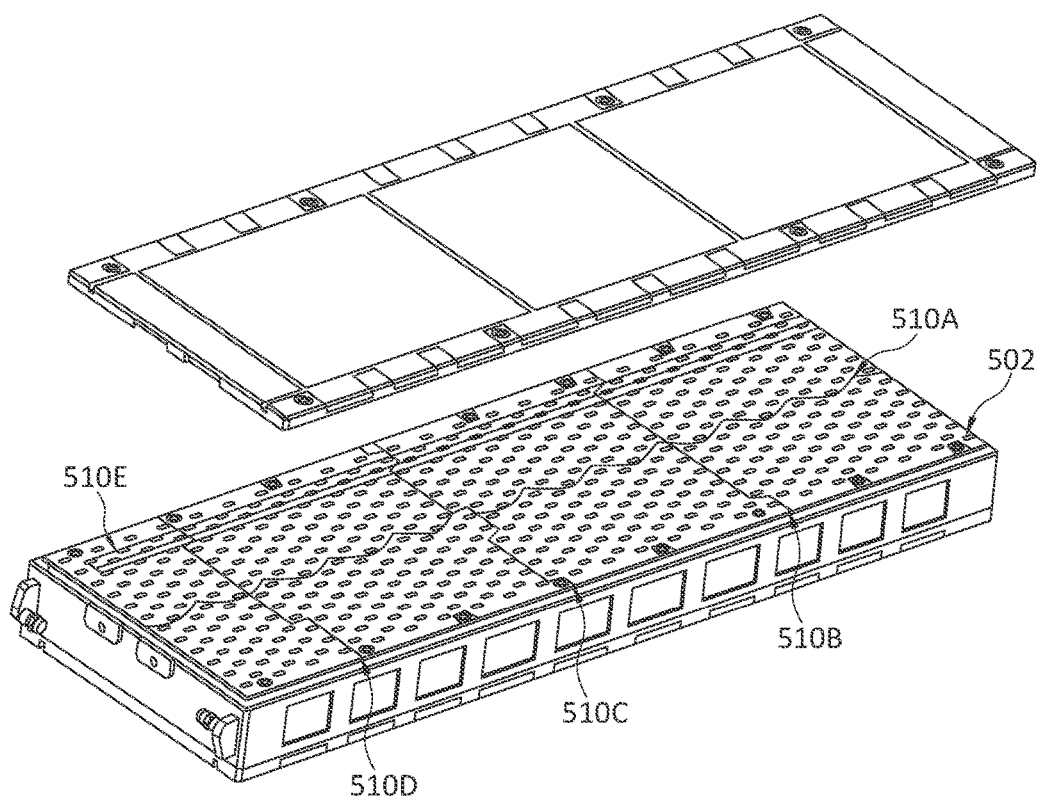
FIG. 5 illustrates the case for a group of cells in an exploded isotropic view.

The disclosed technique includes positioning the conductive layer 210 in a plurality of positions within the energy storage device. For example, the conductive layer 210 can be positioned around one or more cell cases (e.g., as shown in FIG. 4) and/or within one or more cell cases (e.g., as shown in FIG. 5). Multiple conductive layers can be used throughout the energy storage device. Conductive layers can be positioned to in vulnerable locations (e.g., around individual cells) to ensure hazardous conditions are promptly detected in certain vulnerable regions. Multiple conductive layers can be used to form a grid or a net that can be placed inside and/or outside of the enclosure providing high level of design safety and redundancy.

Figure 3A:
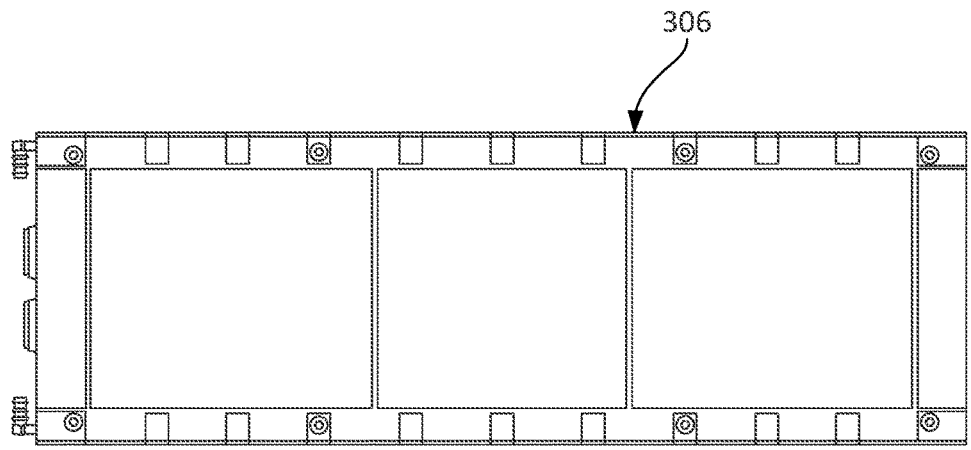
FIG. 3A illustrates an outside cover of a case for a group of cells in a top view.
Figure 3B:
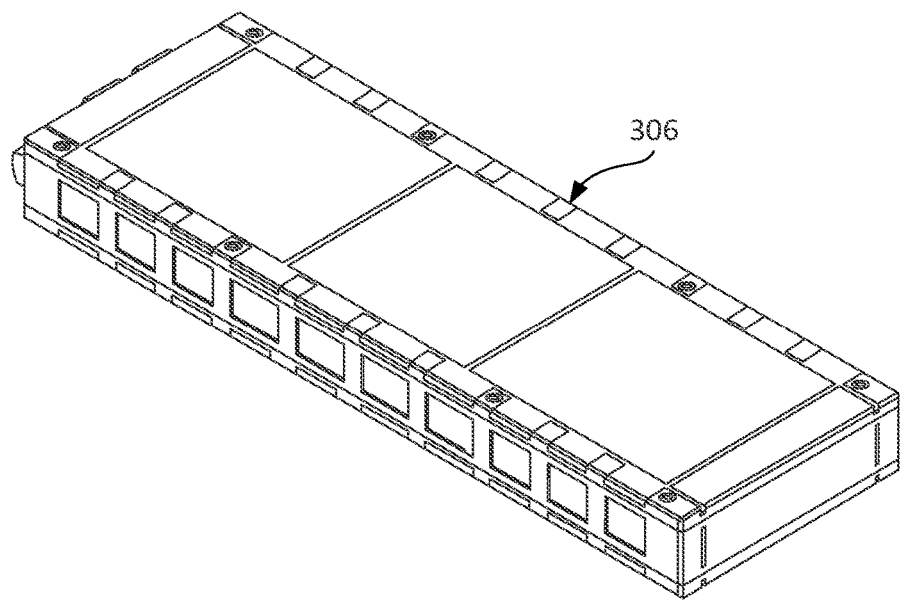
FIG. 3B illustrates an outside cover of a case for a group of cells in an isotropic view.

FIGS. 3A-3B show a top view and an isotropic view, respectively, of an outside cover of a cell case 306. The cell case can hold groups of cells (e.g., battery cells or fuel cells). A conductive layer can be used in a cell case as a primary or second protective measure. One or more conductive layers can be attached along an outside or inside cover of the cell case. For instance, a conductive layer can be attached along a perimeter of the cell case, along a seal between one or more covers of the cell case, along one or more inner components of the cell case (e.g., one or more battery cells), or any combination thereof.

FIG. 4 shows an exploded isotropic view of the cell case. The cell case includes a plurality of cells (e.g., cell 402). Conductive wire 410A (e.g., conductive layer 210) is positioned on an upper cover of the cell case. Conductive wire 410A winds along an edge of the upper cover. Conductive wire 410B (e.g., conductive layer 210) is positioned along a lower cover of the cell case.

If the cell case reaches a temperature exceeding a melting point of either of the conductive wire 410A or the conductive wire 410B, a change in an electrical parameter (e.g., current and/or voltage) is detected in the melted wire. A melting point for the conductive wire 410A and 410B can be the same or different. Upon detecting a change in an electrical parameter (e.g., current and/or voltage) associated with a hazardous condition (e.g., high temperature, collision, or moisture), If the cell case receives an impact buckling or fracturing the enclosure of the cell case (e.g., a top cover, bottom cover, or sidewall), a conductive layer (e.g., conductive wire 410A or 410B) can fracture. If a conductive layer fractures, an open circuit can result (e.g., current drops to zero). The energy management system can detect the change in an electrical parameter (e.g., current and/or voltage) and terminate operation of the energy storage device.

In the case of a single cell explosion, an explosive fume can burst through the lip seal (e.g., lip seal 612 of FIG. 6), along the perimeter of the wall of the cell case. Fracturing the lip seal can cause a conductive wire traversing the lip seal to fracture. Fracturing the conductive wire creates an open circuit. The open circuit is detected by the energy management system. The energy management system terminates operation of the energy storage device.

If the cells case gets wet (e.g., due to a leak), a short circuit can result. The electrical sensor (e.g., a current and/or voltage sensor) detects the short circuit. The energy management system terminates the energy storage system. Terminating the energy storage system may protect the vehicle and occupants of the vehicle from the high voltage source of the energy storage device.

FIG. 5 shows an exploded isotropic view of the cell case having a plurality of cells (e.g., cell 502). One or more conductive wires (e.g., conductive wires 510A, 510B, 510C, 510D, and 510E) can be in contact with each cell within the cell case or a subset of cells within the cell case.

In the event any cell in contact with or in proximity to a conductive wire reaches the predetermined melting temperature, the conductive wire melts and breaks. The melted conductive wire creates an open circuit. The energy management system detects the change in an electrical parameter (e.g., current and/or voltage) and terminates operation of either of a subset of the energy storage device (e.g., a single cell, group of cells, a cell case, etc.) or the entire energy storage device.

If an impact causes a conductive wire to fracture within the cell case, the energy management system detects a change in an electrical parameter (e.g., current and/or voltage) associated with a hazardous condition. Upon detecting the hazardous condition, the energy management system terminates operation of either of a subset of the energy storage device (e.g., a single cell, group of cells, a cell case, etc.) or the entire energy storage device.

If water is present at any of cell (e.g., cell 502), a short circuit can result for a conductive wire in contact with or in a proximity to the cell. Upon detecting the hazardous condition, the energy management system terminates operation of either of a subset of the energy storage device (e.g., a single cell, group of cells, a cell case, etc.) or the entire energy storage device.

Figure 6:
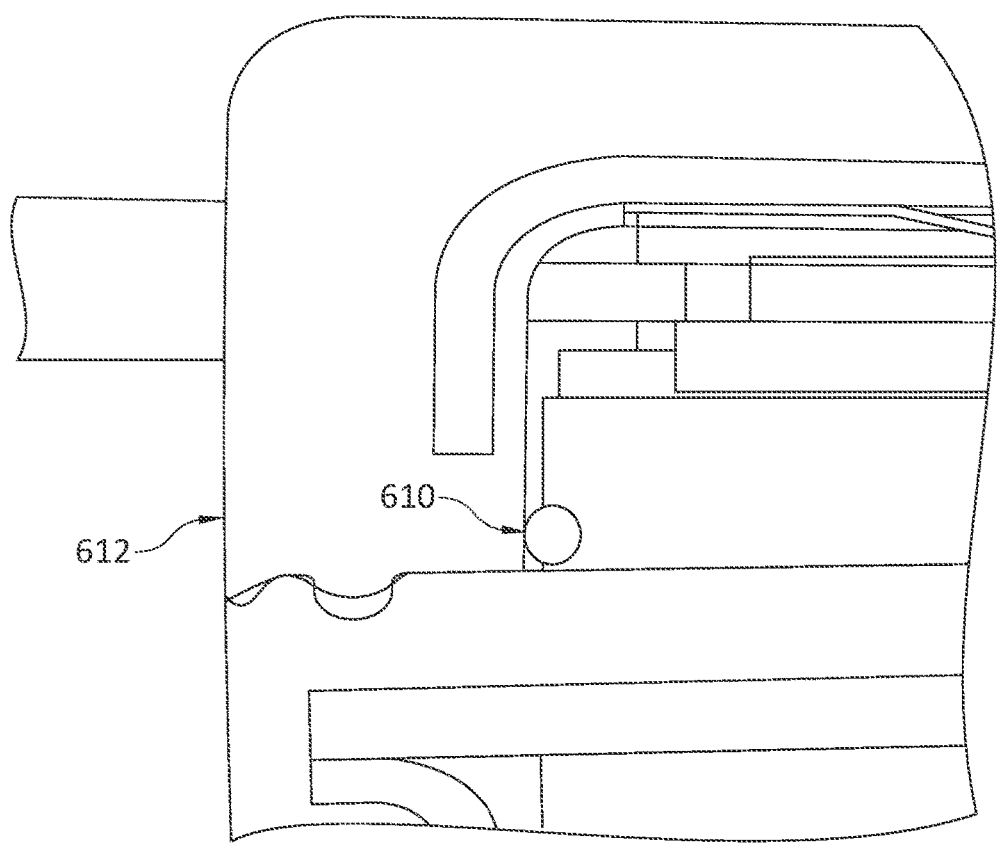
FIG. 6 illustrates a fracturable seal of an enclosure of the energy storage device in a cross-sectional view.

FIG. 6 shows a cross-sectional view of a fracturable seal (or lip seal 612) of an enclosure of the energy storage device. A cross-section of a conductive layer 610 traversing the fracturable seal is shown.

In the case of a single cell explosion, an explosive fume can burst through a fracturable seal (e.g., lip seal 612), along the perimeter of the wall of the cell case. Fracturing the fracturable seal can cause a conductive layer 610 traversing the fracturable seal to fracture. Fracturing the conductive layer 610 creates an open circuit. The open circuit is detected by the energy management system. The energy management system terminates operation of the energy storage device.

A flexible lip seal can be included on a sidewall of a cell case (e.g., a battery module) to enable fumes and debris to escape and/or to isolate fumes and debris from other cells. A relief space having an inert gas (e.g., argon) can be used as a pathway to direct fumes and debris up to the flexible lip seal. The inert gas deprives any fumes and debris of oxygen and does not react with lithium found in many types of battery cells. A fracturable or flexible seal (e.g., lip seal 612) can attach an outer edge of a lower surface of the top cover to an upper surface of a sidewall or a bottom cover. The fracturable or flexible seal can attach an outer edge of an upper surface of the bottom cover 116 to a bottom surface of sidewall 120. The fracturable or flexible seal can be used to direct explosive emissions in a direction in line with the fracturable or flexible seal and a channel within the a cell case (e.g., a battery module). The channel and fracturable or flexible seal are used to direct explosion emissions away from passengers of an electric vehicle. For example, the fracturable or flexible lip seal can direct explosion emissions sideways or downward if passenger space is positioned above the cell case.

Figure 7:
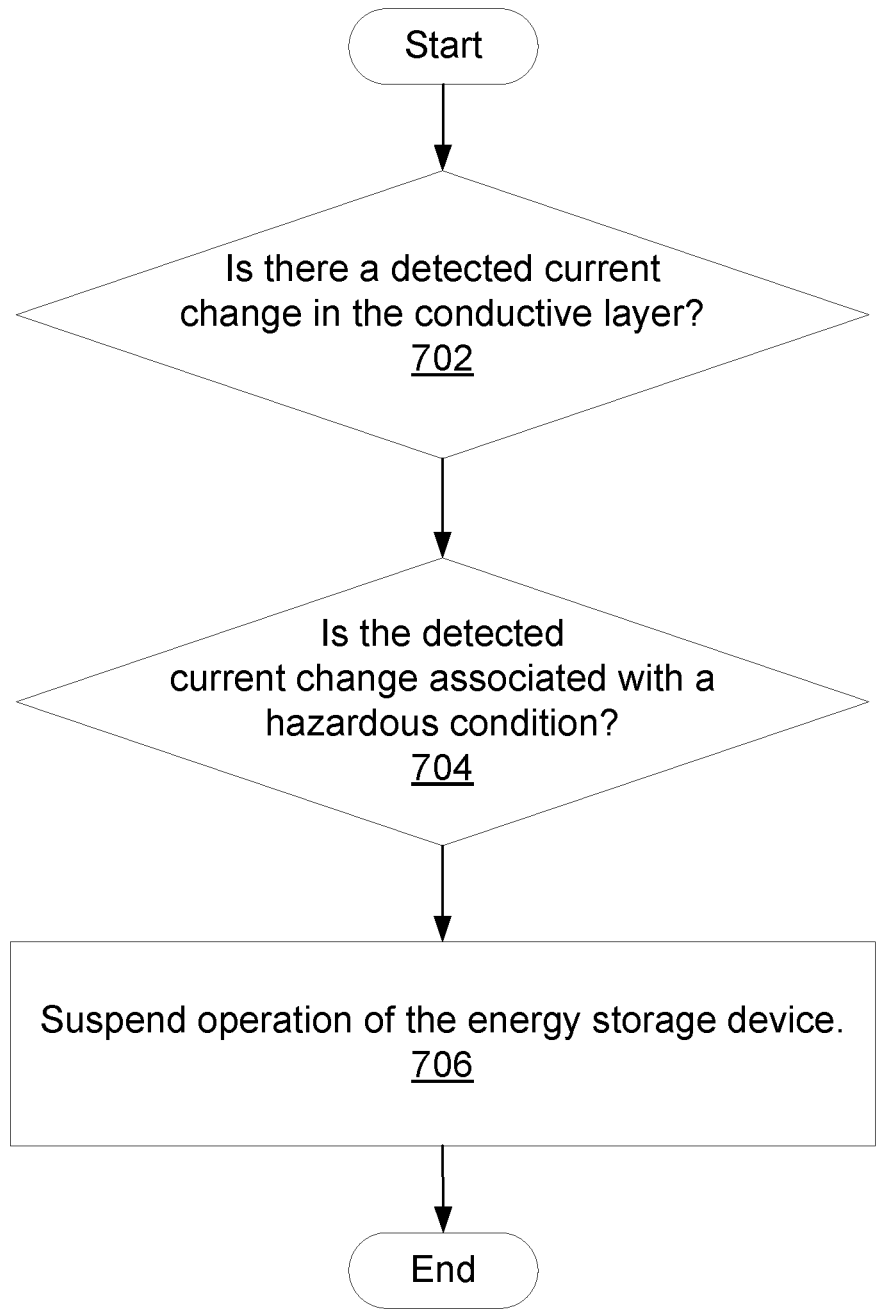
FIG. 7 is a flow diagram that illustrates an example of how an energy management system can determine whether to suspend operation of the energy storage device.

FIG. 7 is a flow diagram that illustrates how an energy management system determines whether to suspend operation of the energy storage device. The energy management system can include a computer system (e.g., the computer system 900 of FIG. 9) having instructions stored in a non-transitory memory for performing one or more methods. A method performed by the energy management system can include, for example, determining if there is a change in an electrical parameter (e.g., current and/or voltage) in a conductive layer (or in multiple conductive layers) (step 702), determining if an identified change in the electrical parameter is associated with a hazardous condition (step 704), and in response to determining that an identified change in the electrical parameter is associated with a hazardous condition, suspending operation of a subset of the energy storage device (e.g., one or more cells, a cell case, etc.) or the entire energy storage device (step 706).

Step 702 involves determining if there is a change in the electrical parameter in a conductive layer. The energy storage system includes one or more current detectors. A current detector measures a current for a conductive layer and provides a data stream indicative of a current of a current layer to the energy storage system. The energy storage system receives the data stream indicative of the current of the conductive layer. The energy storage system can perform a continuous analysis of change in one or more electrical parameters. A detected change in an electrical parameter can be a change in the electrical parameter exceeding a certain threshold or can be any change in the electrical parameter. The certain threshold can be a threshold of a measuring instrument (e.g., the current detector/sensor) and/or can be a threshold implemented as a filtering technique.

Step 704 involves determining if an identified change in an electrical parameter (e.g., current and/or voltage) is associated with a hazardous condition. The energy storage device can include many electrical fields that can cause slight changes in an electrical parameter (e.g., current and/or voltage) in the conductive layer. Frequent variations in current within an operating range of the energy storage device are not associated with a hazardous condition. Sudden drastic changes in current (e.g., dropping to no current) can be associated with a hazardous condition. A hazardous condition can include, for example, a temperature exceeding a threshold (e.g., a melting temperature of one or more conductive layers), a stress event exceeding a threshold (e.g., a fracture strength of one or more conductive layers), moisture in contact with one or more conductive layers, or any combination thereof.

Step 706 involves suspending operation of a subset of the energy storage device or the entire energy storage device. The subset of the energy storage device can include, for example, one or more cells or one or more cell cases. Suspending operation can be in response to determining that an identified change in an electrical parameter (e.g., current and/or voltage) is associated with a hazardous condition.

Figure 8:
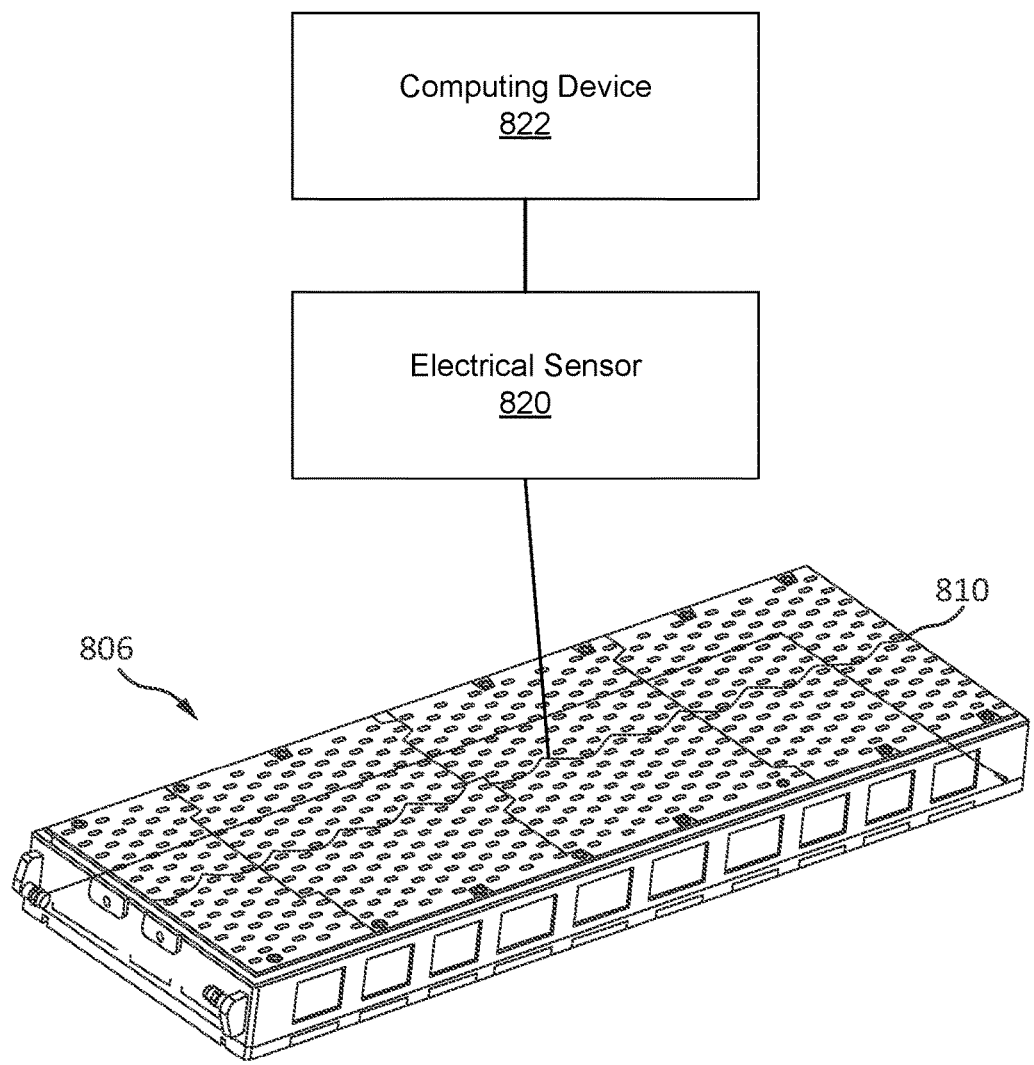
FIG. 8 is a diagrammatic representation of an electrical sensor connected to the energy storage device.

FIG. 8 is a diagrammatic representation of an electrical sensor 820 connected to an energy storage device 806. The electrical sensor 820 can include a current sensor, voltage sensor, or a combination thereof. The electrical sensor 820 can be electrically connected to a conductive layer 810 of the energy storage device 802. The electrical sensor 820 can be electrically connected to a plurality of conductive layers. A plurality of electrical sensors can be electrically connected to any of a plurality of conductive layers.

A computing device 822 can be connected to the electrical sensor 820. The computing device 822 can be connected to the electrical sensor 820 by a wired or wireless communication device. For example, a cable can extend from the electrical sensor 820 to the computing device 822. In another example, a wireless communication device configured to transmit wireless messages using a standardized set of communication protocols can be used to wirelessly transmit information (e.g., current and/or voltage data) from the electrical sensor 820 to the computing device 822. A data stream can be transmitted (e.g., via a cable and/or wireless communication device) from the electrical sensor 820 to the computing device 822.

The computing device 822 can be part of the energy management system discussed above with reference to FIG. 7. The computing device 822 can, for example, determine whether to suspend operation of the energy storage device. The computing device 822 can be connected to a switch (or a plurality of switches) configured to deactivate the energy storage device 806. The switch can be located within the energy storage device. The switch can remove or restore a conducting path among the plurality of cells in the electric storage device 822. Upon determining that a hazardous condition exists, the computing device 822 can cause the switch to interrupt the conducting path among the plurality of cells. Interrupting the conducting path can break an electrical circuit among a plurality of cells configured in series. More than one switch may be used to interrupt a conducting path, for example, if any of the plurality of cells are configured in parallel. Various combinations and redundant configurations of switches are contemplated. One or more redundant switch(es) can be used, for example, in the event of a failure of a primary switch. Redundant switch(es) can increase safety and ensure to a greater probability that the energy management system can successfully suspend operation of the energy storage device in the event of a hazardous condition.

Computer

Figure 9:
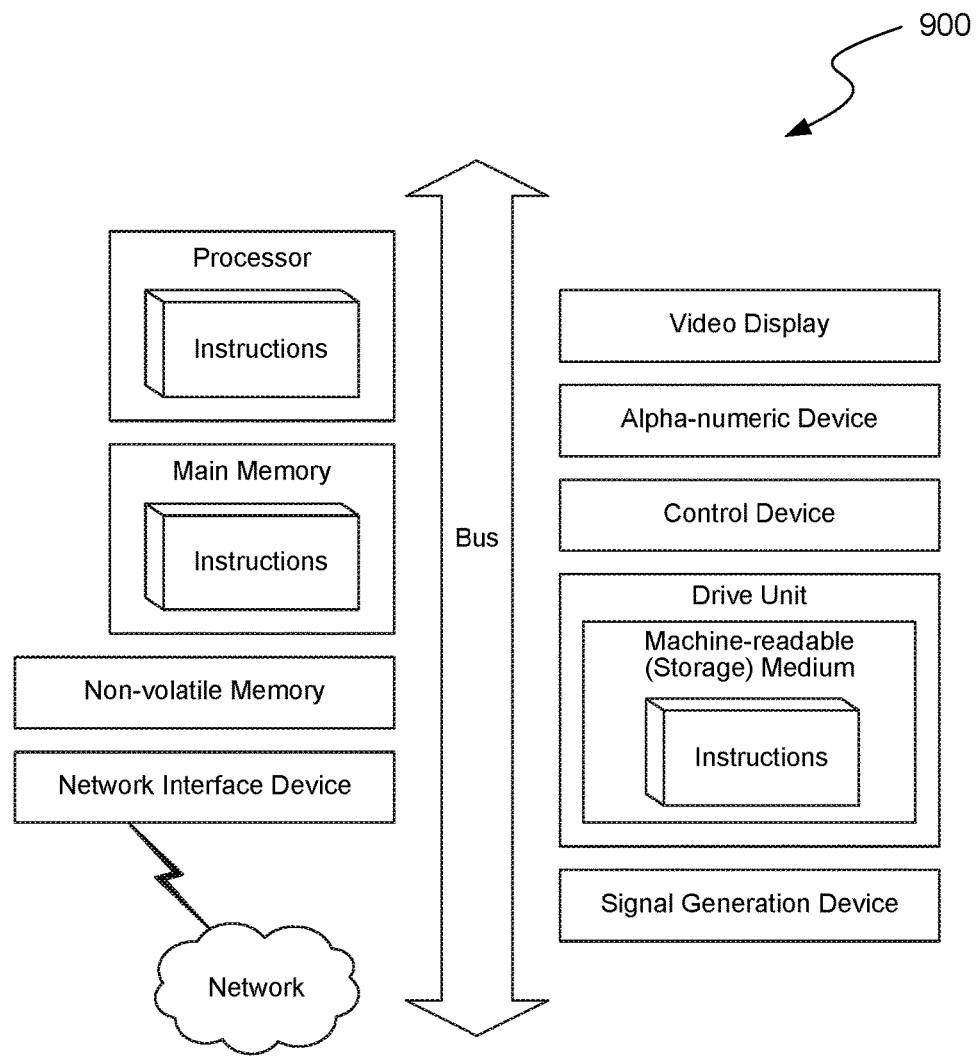
FIG. 9 is a diagrammatic representation of a machine in the example form of a computer system.

FIG. 9 is a diagrammatic representation of a machine in the example form of a computer system 900 within which a set of instructions, for causing the machine to perform any one or more of the methodologies or modules discussed herein, may be executed. For example, the computer system 900 can be a component of the energy management system discussed above with reference to FIG. 7. The computer system 900 can, for example, determine whether to suspend operation of the energy storage device. In an example, the computer system 900 can be connected to the electrical sensor as illustrated in FIG. 8.

In the example of FIG. 9, the computer system 900 includes a processor, main memory, non-volatile memory, and an interface device. Various common components are omitted (e.g., cache memory) for illustrative simplicity. The computer system 900 is intended to illustrate a hardware device on which any of the components described in the example of FIGS. 1-8 (and any other components described in this specification) can be implemented. The computer system 900 can be of any applicable known or convenient type. The components of the computer system 900 can be coupled together via a bus or through some other known or convenient device.

This disclosure contemplates the computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 900. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. An example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

What is claimed is:

1. An energy storage device comprising:
a coolant delivery system to distribute a liquid coolant to any of a plurality of cells within an enclosure;
a conductive layer extending a length along the enclosure, the conductive layer including a wire or strip to carry a current along the enclosure,
wherein a melting point of the conductive layer is lower than a boiling point of the liquid coolant; and
an electrical sensor electrically connected to the conductive layer and configured to detect a change in an electrical parameter in the conductive layer.

2. The energy storage device of claim 1, wherein the enclosure includes a fracturable seal configured to fracture upon a stress event exceeding a fracture strength of the fracturable seal, and wherein the conductive layer traverses the fracturable seal.

3. The energy storage device of claim 2, wherein the fracturable seal has a lower fracture strength than the enclosure.

4. The energy storage device of claim 2, wherein fracture of the fracturable seal results in fracture of the conductive layer traversing the fracturable seal.

5. The energy storage device of claim 1, wherein fracture of the conductive layer results in an open circuit detectable by the electrical sensor.

6. The energy storage device of claim 1, wherein the conductive layer includes bismuth, lead, tin, cadmium, indium, thallium, mercury, gallium, one or more alkali metals, or any combination thereof.

7. The energy storage device of claim 1, wherein the conductive layer includes bismuth, lead, and tin.

8. The energy storage device of claim 1, wherein the conductive layer is composed of approximately 50% bismuth by weight, approximately 25% lead by weight, and approximately 25% tin by weight.

9. The energy storage device of claim 1, wherein the melting point of the conductive layer is less than 110 degrees Celsius.

10. The energy storage device of claim 1, wherein melting of the conductive layer results in an open circuit detectable by the electrical sensor.

11. The energy storage device of claim 1, wherein moisture on the conductive layer results in a short circuit detectable by the electrical sensor.

12. The energy storage device of claim 1, further comprising:
an energy management system configured to suspend operation of the energy storage device in response to the electrical sensor detecting the change in the electrical parameter in the conductive layer.

13. The energy storage device of claim 1, further comprising:
an energy management system including a processor configure to:
receive a data stream from the electrical sensor indicative of the electrical parameter in the conductive layer;
identify, based on the data stream, the change in the electrical parameter associated with a hazardous condition; and
in response to identifying a the change in the electrical parameter associated with the hazardous condition, suspending operation of the energy storage device.

14. The energy storage device of claim 13, wherein the hazardous condition includes a fracture, temperature above a threshold, presence of moisture, or any combination thereof.

15. An energy storage device comprising:
a plurality of cells within an enclosure formed by a top cover, a bottom cover, and at least one sidewall, the enclosure including a fracturable seal;
a coolant delivery system to distribute a liquid coolant to any of the plurality of cells within the enclosure;
a conductive layer extending a length along the enclosure, the conductive layer including a wire or strip to carry a current along the enclosure,
wherein a melting point of the conductive layer is lower than a boiling point of the liquid coolant; and
an electrical sensor electrically connected to the conductive layer and configured to detect a change in an electrical parameter in the conductive layer.

16. The energy storage device of claim 15, wherein fracture of the fracturable seal fractures the conductive layer traversing the fracturable seal resulting in an open circuit detectable by the electrical sensor.

17. The energy storage device of claim 15, wherein melting of the conductive layer results in an open circuit detectable by the electrical sensor.

18. The energy storage device of claim 15, wherein moisture on the conductive layer results in a short circuit detectable by the electrical sensor.

19. The energy storage device of claim 15, further comprising:
an energy management system configured to suspend operation of the energy storage device in response to the electrical sensor detecting the change in the electrical parameter in the conductive layer.

20. An energy storage device, the energy storage device comprising:
a plurality of cells within an enclosure formed by a top cover, a bottom cover, and at least one sidewall;
a coolant delivery system to distribute a liquid coolant to any cell among the plurality of cells within an enclosure;
a conductive layer extending a length of a component of the energy storage device, the conductive layer including a wire or strip to carry a current along an edge of the component; and
an energy management system configured to suspend operation of the energy storage device in response to an electrical sensor detecting a change in an electrical parameter in the conductive layer.

21. The energy storage device of claim 20, wherein the component of the energy storage device includes:
the enclosure;
any cell among the plurality of cells;
a cell pack including a subset of the plurality of cells;
the coolant delivery system; or
any combination thereof.

* * * * *